(12) United States Patent
Trucksess

(10) Patent No.: US 10,941,528 B2
(45) Date of Patent: Mar. 9, 2021

(54) ROLLER COMPACTOR

(71) Applicant: Volvo Construction Equipment AB, Eskilstuna (SE)

(72) Inventor: Andrew Trucksess, Hanover, PA (US)

(73) Assignee: Volvo Construction Equipment AB, Eskilstuna (SE)

(*) Notice: Subject to any disclaimer, the term of this patent is extended or adjusted under 35 U.S.C. 154(b) by 0 days.

(21) Appl. No.: 16/479,389

(22) PCT Filed: Jan. 23, 2017

(86) PCT No.: PCT/US2017/014506
§ 371 (c)(1),
(2) Date: Jul. 19, 2019

(87) PCT Pub. No.: WO2018/136092
PCT Pub. Date: Jul. 26, 2018

(65) Prior Publication Data
US 2019/0382965 A1    Dec. 19, 2019

(51) Int. Cl.
| E01C 19/00 | (2006.01) |
| E01C 19/23 | (2006.01) |
| B33Y 10/00 | (2015.01) |
| B33Y 70/00 | (2020.01) |
| B33Y 80/00 | (2015.01) |
| B29C 64/188 | (2017.01) |

(Continued)

(52) U.S. Cl.
CPC .......... *E01C 19/236* (2013.01); *B29C 64/188* (2017.08); *B33Y 10/00* (2014.12); *B33Y 70/00* (2014.12); *B33Y 80/00* (2014.12); *C08J 5/042* (2013.01); *E01C 19/282* (2013.01); *E01C 19/286* (2013.01); *B29K 2105/122* (2013.01); *B29L 2031/324* (2013.01); *C08J 2333/04* (2013.01); *C08J 2361/06* (2013.01); *C08J 2363/00* (2013.01); *C08J 2367/00* (2013.01); *C08J 2377/06* (2013.01)

(58) Field of Classification Search
CPC .... E01C 19/236; E01C 19/282; E01C 19/286; B33Y 10/00; B33Y 70/00; B33Y 80/00; C08J 5/042; C08J 2333/04; C08J 2361/00; C08J 2363/00; C08J 2377/06; B29L 2031/324; B29K 2105/122; B29C 64/188
USPC ....................................... 404/117, 124–133.2
See application file for complete search history.

(56) References Cited

U.S. PATENT DOCUMENTS

| 5,324,248 A | 6/1994 | Quigley | |
| 5,421,670 A * | 6/1995 | Meirick | E01C 19/43 |
| | | | 404/124 |

(Continued)

FOREIGN PATENT DOCUMENTS

| CN | 103233683 A | 8/2013 |
| WO | WO 2011/094411 A1 | 8/2011 |

OTHER PUBLICATIONS

International Search Report and Written Opinion of the International Searching Authority, PCT/US2017/014506, dated May 26, 2017, 11 pages.

*Primary Examiner* — Raymond W Addie
(74) *Attorney, Agent, or Firm* — Sage Patent Group

(57) ABSTRACT

A drum for a roller compactor has an outer shell providing an exterior peripheral compacting surface and an interior for housing an excitation system used to vibrate the drum. The outer shell includes a non-elastic polymer with embedded reinforcing fibers.

19 Claims, 4 Drawing Sheets

(51) Int. Cl.
*C08J 5/04* (2006.01)
*E01C 19/28* (2006.01)
*B29K 105/12* (2006.01)
*B29L 31/32* (2006.01)

(56) References Cited

U.S. PATENT DOCUMENTS

| | | | | |
|---|---|---|---|---|
| 5,511,901 | A * | 4/1996 | Yates | E01C 19/236 |
| | | | | 404/124 |
| 6,206,994 | B1 * | 3/2001 | Shieh | D21G 1/0233 |
| | | | | 156/172 |
| 6,350,082 | B1 | 2/2002 | Rickards | |
| 6,982,116 | B1 * | 1/2006 | Passman | B05D 7/02 |
| | | | | 428/292.1 |
| 7,066,681 | B2 * | 6/2006 | Paske | E01C 19/286 |
| | | | | 404/117 |
| 7,200,935 | B2 * | 4/2007 | Davenport | B21B 1/22 |
| | | | | 29/895 |
| 7,673,432 | B2 * | 3/2010 | Teng | E04C 5/07 |
| | | | | 52/745.17 |
| 10,214,865 | B2 * | 2/2019 | Meier | E02D 3/026 |
| 2003/0108389 | A1 * | 6/2003 | Codina | E01C 19/286 |
| | | | | 404/117 |
| 2005/0266228 | A1 | 12/2005 | Jain et al. | |
| 2006/0034659 | A1 | 2/2006 | Magee | |
| 2008/0067002 | A1 | 3/2008 | Pfaffelhuber et al. | |
| 2008/0292401 | A1 | 11/2008 | Potts | |
| 2015/0352785 | A1 | 12/2015 | Folgar et al. | |
| 2016/0102438 | A1 * | 4/2016 | Kreische | F16C 3/28 |
| | | | | 404/117 |

* cited by examiner

ROLLER COMPACTOR

CROSS REFERENCE TO RELATED APPLICATIONS

This application is a 35 U.S.C. § 371 national stage application of PCT International Application No. PCT/US2017/014506 filed on Jan. 23, 2017, the disclosure and content of which is incorporated by reference herein in its entirety.

FIELD OF THE DISCLOSURE

The present disclosure relates to construction machines, and particularly roller compactors. More particularly, the present disclosure relates to drums for roller compactors.

BACKGROUND

Roller compactors are used to compact a variety of substrates, from soil to asphalt. A typical roller compactor 10 is shown in FIG. 1 and a partial cross-section of a typical drum 12 for the roller compactor is shown in FIG. 2. The roller compactor 10 includes a frame 14 and can have a cab 16 for an operator. The drum 12 is typically rotated around a rotational axis X (as shown in FIG. 2) by a drive motor 20 mounted to the drum 12 with a plurality of vibration isolation mounts 22. As seen in FIG. 2, excitation systems, such as an eccentric system 24, provide a vibratory function to the drum 12. The eccentric system 24 may include an eccentric mass 26 rotated on a rotational axis Y by an eccentric motor 28. In some embodiments, the rotational axis X of the drive motor corresponds with the rotational axis Y of the eccentric motor 28.

Traditional compactor drums 12 are currently fabricated from several pieces using steel. Steel traditionally is used for its ultimate tensile strength, hardness and wear resistance. Steel is currently selected in order to handle the vibrational forces imparted by the excitation system. In addition, designers traditionally believe that the weight inherent to steel drums is an asset of the roller compactor 10.

Manufacturers, however, continue to seek improvements in roller compactor design.

SUMMARY

Embodiments of the present disclosure include a drum for a roller compactor. The drum can comprise an outer shell providing an exterior peripheral compacting surface and an interior for housing an excitation system used to vibrate the drum. The outer shell can comprise a non-elastic polymer with embedded reinforcing fibers.

Additional embodiments of the present disclosure include roller compactors. The roller compactors can comprise at least one drum configured to compact construction materials. The drum can comprise an outer shell providing an exterior peripheral compacting surface. The outer shell can comprise a polymer with reinforcing fibers. The roller compactor can further comprise an excitation system at least partially within the outer shell for vibrating the drum.

Yet other embodiments include methods of making a drum for a roller compactor. The method can include performing additive manufacturing to build an integral, one-piece drum body from a fiber reinforced polymer, the drum body comprising an outer, substantially cylindrical shell with at least one head plate extending from an interior surface of the shell. In some embodiments the method can also include pausing the additive manufacturing step prior to completion of the drum body to allow for adding one or more reinforcing components to the partially completed drum body before completing the additive manufacturing of the drum body, wherein the one or more reinforcing components is at least partially embedded within the drum body.

These and other aspects of the present disclosure will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect can be combined with features from any other embodiment or aspect in any appropriate combination. For example, any individual or collective features of method aspects or embodiments can be applied to apparatus, product or component aspects or embodiments and vice versa.

Figure 3:
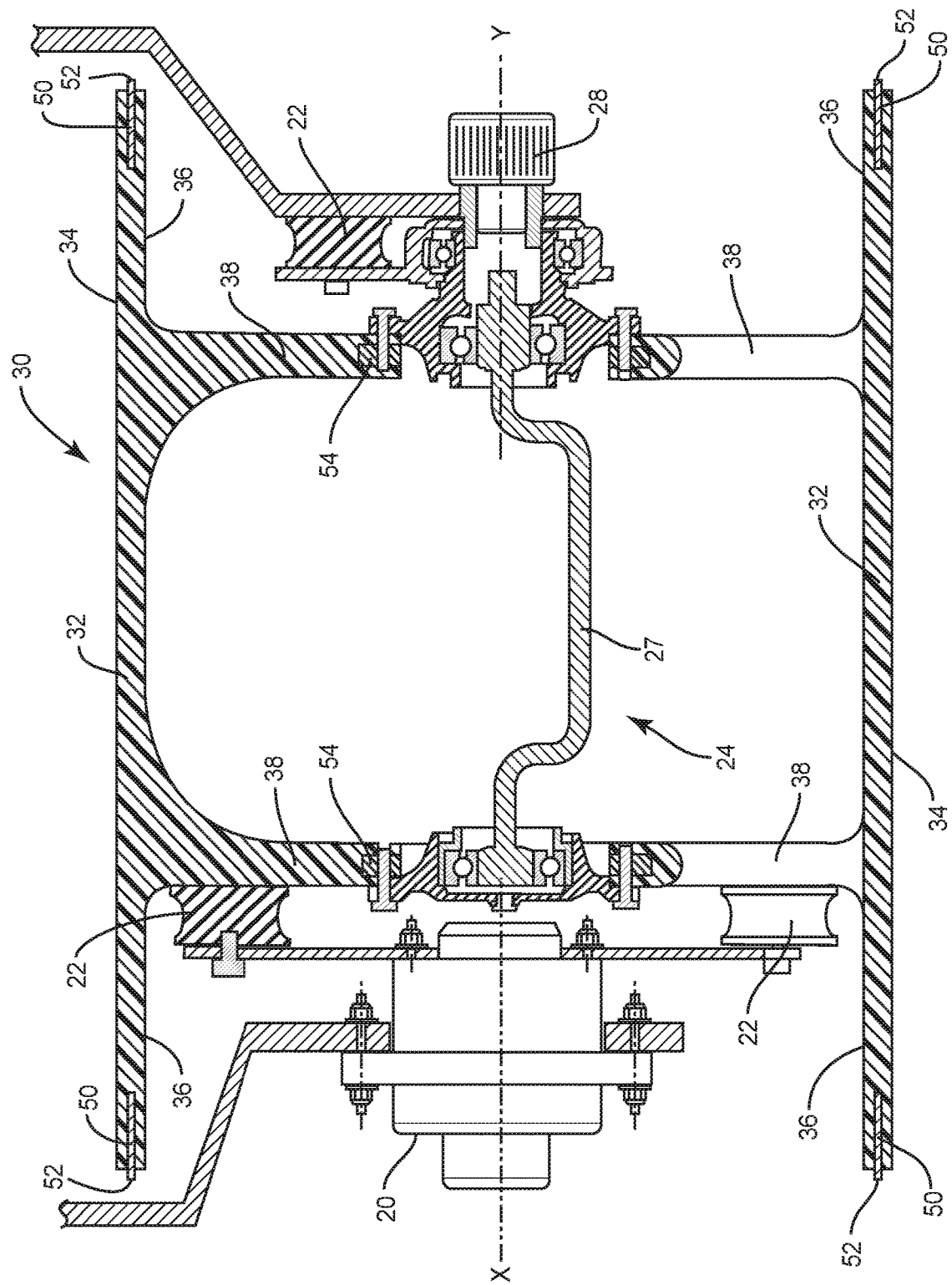
FIG. 3 shows a partial longitudinal cross section through a drum according to embodiments of the present disclosure.

As shown in FIG. 3, a drum 30 according to embodiments of the present disclosure is shown. The drum 30 includes an outer shell 32. The outer shell 32 can be generally tubular, with an exterior peripheral compacting surface 34. The exterior peripheral compacting surface 34 can be generally cylindrical. In some embodiments, particularly for use in soil compaction, a cylindrical exterior peripheral compacting surface 34 can further comprise a plurality projections, as known in the art, extending from the exterior peripheral compacting surface.

Figure 4:
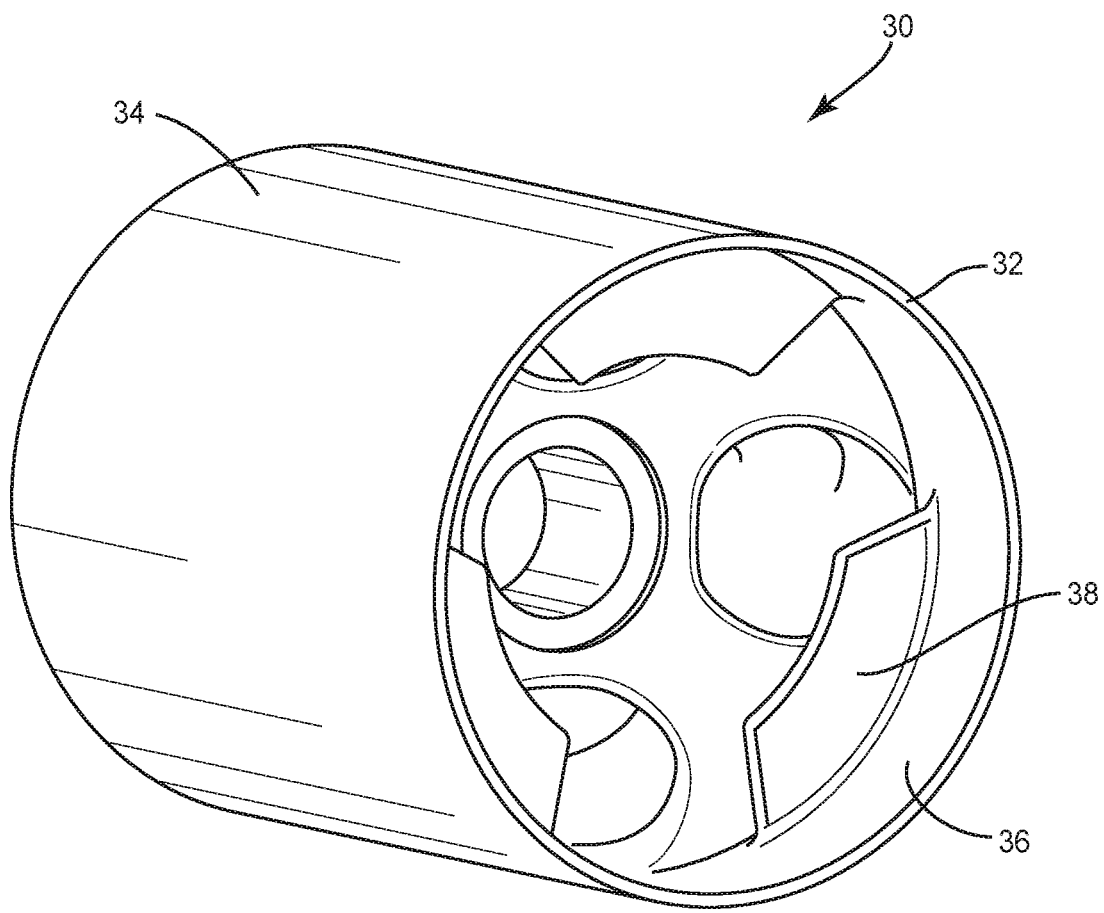
FIG. 4 shows a perspective view of a drum according to an embodiment of the present disclosure.

The outer shell 32 can further comprise an interior surface 36. One or more head plates 38 can extend substantially radially inwardly from the interior surface 36 toward the rotational axis X of the drum 30. The head plates 38 can be annular to extend from the circumference of the interior surface 36. In other embodiments, such as shown in FIG. 4, the head plates 38 can be provided as segments extending from and around only a portion of the circumference of the drum 30. Head plates 38 can serve several functions, including one or more of the following: supporting vibration isolation mounts 22, supporting a portion of the eccentric system 24, supporting the drive motor 20, creating cavities for containing lubricants, or supporting bearing housings.

Instead of using steel to form the drum, drums 30 of the present disclosure are made at least in part from non-elastic fiber-reinforced polymer (FRP). Examples of polymer binders for forming the FRP include, but are not limited to, epoxy, vinyl ester, polyester thermosetting plastic, nylon and phenol formaldehyde resins. Examples of reinforcing fibers for forming the FRP include, but are not limited to, glass, carbon, aramid, and basalt.

In one embodiment, the outer shell 32 of the drum 30 is constructed from fiber reinforced polymer. In the present embodiment, the head plates 38 can be formed from steel or other metallic materials. The head plates 38 can be assembled within the outer shell 32 to form the completed drum 30 using adhesive, bolts, or other known attachment methods. In another embodiment, the outer shell 32 and the head plates 38 are formed primarily of FRP. The outer shell 32 and the head plates 38 can be formed separately and assembled together with known methods such as bonding. In yet other embodiments, the outer shell 32 and the head plates 38 are formed from the same FRP in a single process to result in a unitary, integral construction of the drum 30. A unitary construction also provides the advantage of minimizing the presence of joints. Joints and other connection points can be areas of wear and degradation in roller compactors.

By way of example, and not limitation, a drum 30 whose outer shell 32 and head plates 38 are formed from carbon fiber reinforced epoxy could provide an approximate 65% weight reduction compared to a traditional steel drum 12 with the same external circumference. Similar to the use of steel, the ultimate tensile strength, hardness and abrasion resistance can be factors for consideration when selecting the desired fiber reinforced polymer. In one embodiment, the ultimate tensile strength can be equal to or greater than about 400 Mpa. In one embodiment, the Brinell Harness can be equal to or greater than about 100. In another embodiment, the Rockwell B hardness of the FRP can be equal to or greater than about 65. Table 1 compares a typical steel used for traditional drums 12 to exemplary physical properties of polymers reinforced with carbon fiber.

TABLE 1

|  | Tensile Strength Ultimate, Mpa | Hardness, Brinell | Hardness, Rockwell B |
|---|---|---|---|
| FRP: Carbon Fiber Reinforced Polymer | 1000 | 120 | 75 |
| A36 Steel | 450 | 135 | 74 |

A drum 30 made at least partially from FRP can include oleophobic components to minimize adherence between the exterior peripheral compacting surface 34 of the outer shell 32 and the petroleum base of the asphalt. The oleophobic components can be provided as the binder polymer of the FRP. In another example, the oleophobic component can be provided as an added ingredient to the composition forming the binder resin. In another example, the oleophobic component can be provided in particle form embedded within the polymer binder. In even further examples, the oleophobic component can be applied as a coating to the exterior peripheral compacting surface 34.

In some embodiments, the drum 30 can incorporate one or more reinforcing components at least partially embedded in fiber-reinforced polymer portions of the drum. For example, and as shown in FIG. 3, wear rings 50 can be embedded within the outer shell 32. The wear ring 50 could be made of FRP, a metal, or other material. An edge 52 of each wear ring 50 can be exposed at the distal ends of the outer shell 32. The edges 52 of the wear rings 50 can provide edge protection for the drum 30. For example, if the drum 30 were rolling along a curb, the curb could contact and wear the edge 52 of the wear ring 50 instead of the outer shell 32.

By way of a second example, and not limitation, one or more reinforcing plates 54 can be at least partially embedded within the at least one head plate 38. The reinforcing plates 54 can be provided at locations where components are mounted to the head plate 38 to add structural support or reinforcement. The reinforcing plates 54 could be made of FRP, a metal, or other material. In one example, the reinforcing plates 54 can support and reinforce attachment of the vibration isolation mounts 22, or can support and reinforce attachment of the excitation system to the drum 30.

Figure 1:
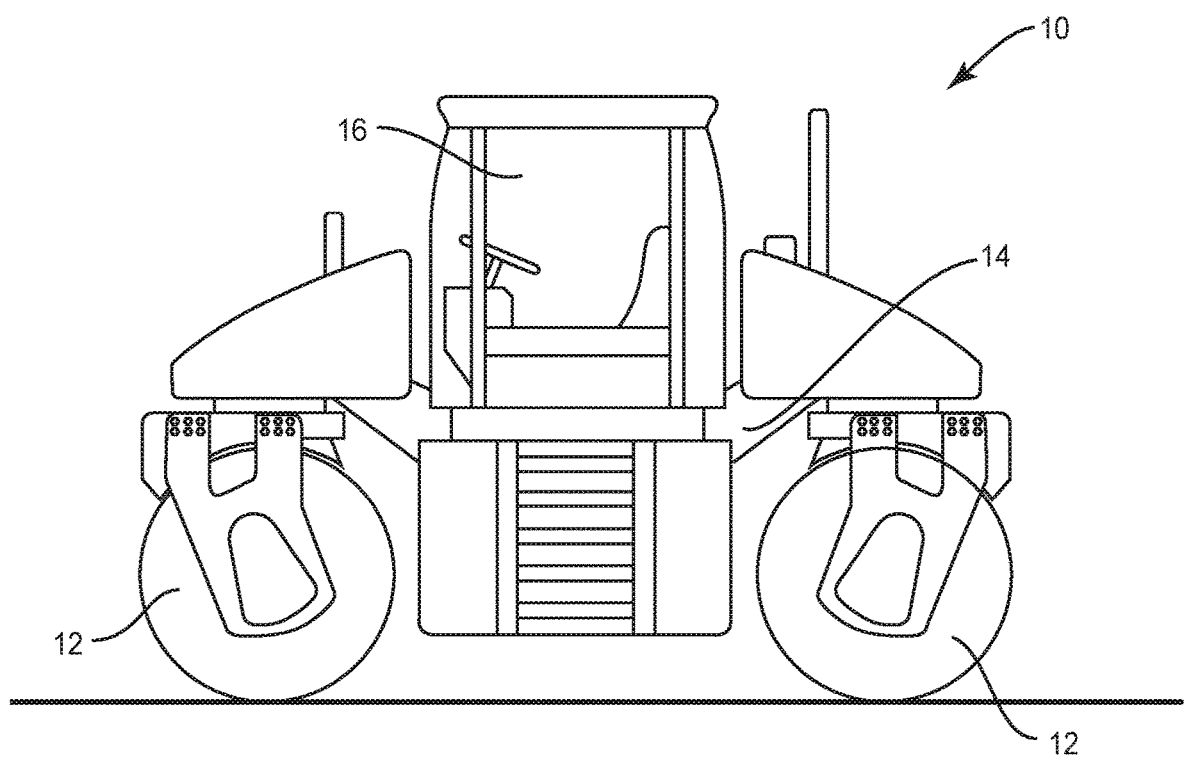
FIG. 1 shows a typical roller compactor.
Figure 2:
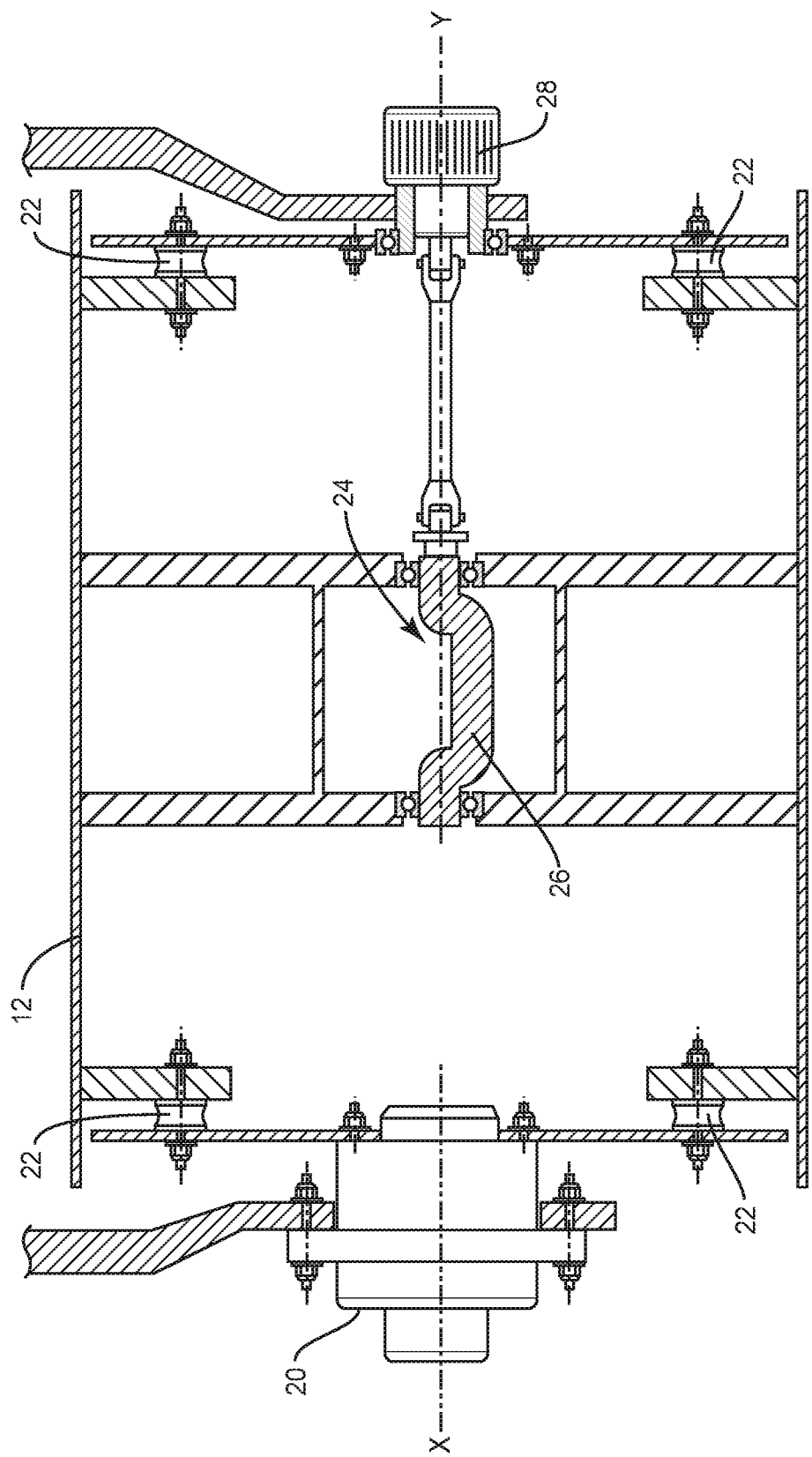
FIG. 2 shows a partial longitudinal cross section through a typical drum of a roller compactor.

A drum 30 fabricated at least partially from fiber reinforced polymers can provide several advantages over traditional drums made primarily from steel. For example, a drum 30 made at least partially from FRP could allow for use of a lighter eccentric mass 27 within an eccentric system 24 compared to the prior eccentric mass 26 (FIG. 2) used with the steel drum 12. The use of the lighter eccentric mass 27 could potentially lead to increased fuel efficiency of the roller compactor 10. The effectiveness of the drum 30 is impacted by the amplitude of the drum's vibration. The amplitude is dependent upon the mass of the drum 30 and the moment force provided by the eccentric system 24. Reducing the mass of the drum 30 allows for reducing the moment force provided by the eccentric system 24, for example by using the lighter eccentric mass 27, while maintaining the amplitude. The lighter eccentric mass 27 could allow for a reduction in the horsepower rating of the eccentric motor 28. The eccentric motor 28 has traditionally been more powerful than the drive motor 20 because the power used to begin rotation of the eccentric mass 26 in a steel drum 12 is often larger than the power used to rotate the drum. Therefore, an ultimate reduction in the demands of the eccentric motor 28, without a reduction in amplitude, can provide an improvement in the efficiency and fuel consumption of the roller compactor 10.

Drums 30 made from fiber reinforced polymer can provide yet additional advantages for roller compactors 10 compared to traditional steel drums 12. First, the weight reduction at one location provided by the use of a drum 30 made from FRP can allow for a more desired overall weight distribution for the roller compactor 10. For example, the experience of an operator can improve if the operator is subject to a reduction in the vibratory forces transmitted from the drum 30. By shifting the weight distribution away from the drum 30 and relatively into the frame 14 or the cab 16, the roller compactor 10 would be more capable of absorbing or damping vibration such that less vibration would be felt by the operator.

Second, if the outer shell 32 is made from a material that can resist sticking to loose asphalt, it can be possible to reduce or eliminate the water system typically used with traditional drums 12 on asphalt compactors. By shrinking the volume of the water tank, or eliminating the water tank completely, the designers can have more flexibility to optimize the weight distribution of the roller compactor 10 over the drums 30. For example, but not limitation, asphalt roller compactors can benefit from an even weight distribution over the pair of drums, while soil compactors seek to shift the weight distribution to be more over the front drum.

Third, structures made from FRP can often be more easily repaired compared to steel. For example, if the exterior peripheral compacting surface 34 were to become damaged, FRP can be added back in the form of a patch to repair the damaged area.

Embodiments of the present disclosure also include methods of making a drum 30 as described above for use on a roller compactor 10. The method can include performing additive manufacturing to build an integral, one-piece drum body from a fiber reinforced polymer. The drum body would include an outer, substantially cylindrical outer shell 32 with at least one head plate 38 extending from an interior surface 36 of the shell. Using known materials, additive manufacturing, such as 3-D printing, provides the ability to create complex three-dimensional shapes with an additive process involving the deposition of thin layers of material on top of one another. The additive manufacturing process can involve melting a filament comprising a polymer binder and micro reinforcing fibers, and depositing the melted material in thin layers. In some instances, melting the material to be used as the drum body includes melting a filament that has a polymer binder, micro filament reinforcing fibers, and a petroleum phobic component. Additive manufacturing provides the ability to produce unitary bodies that minimize the presence of joints or seams, and also minimizes the need for additional assembly. A unitary body can be preferred due to added strength and durability compared to components made from multiple pieces. Areas of weakness, such as seams and joints, can be avoided or minimized.

The method of making a drum 30 can also include pausing the additive manufacturing step prior to completion of the drum body in order to add one or more reinforcing components to the partially completed drum body. In embodiments where the reinforcing components are made from steel, they can be added while the additive manufacturing process is paused using techniques known in the art. In other examples, if metals of a sufficiently low melting point are used for reinforcement, the additive manufacturing process can allow for the substantially simultaneous deposition of two distinct materials.

In one embodiment, when the additive manufacturing process is completed, the one or more reinforcing components would be at least partially embedded within the fiber reinforced polymer of the drum body. In some embodiments, the step of adding one or more reinforcing components can include adding at least one reinforcing plate 54 to a partially completed head plate 38. In some embodiments, adding one or more reinforcing components comprises placing a wear ring 50, or at least a portion thereof, at the distal end of the outer shell 32.

Although the above disclosure has been presented in the context of exemplary embodiments, it is to be understood that modifications and variations can be utilized without departing from the spirit and scope of the invention, as those skilled in the art will readily understand. Such modifications and variations are considered to be within the purview and scope of the appended claims and their equivalents.

The invention claimed is:

1. A drum for a roller compactor, comprising:
an outer shell providing an exterior peripheral compacting surface; and
an interior for housing an excitation system used to vibrate the drum,
wherein the outer shell comprises:
a non-elastic polymer;
reinforcing fibers embedded within the non-elastic polymer; and
at least one reinforcing component at least partially embedded within the non-elastic polymer.

2. The drum of claim 1, wherein the at least one reinforcing component comprises a wear ring at least partially embedded within the outer shell, wherein an edge of the wear ring is exposed at a distal end of the shell, and wherein the edge of the wear ring provides a wear surface for the distal end of the drum.

3. The drum of claim 1, wherein the shell further comprises an oleophobic component.

4. The drum of claim 1, wherein the drum further comprises at least one head plate extending from an interior surface of the outer shell, wherein the at least one head plate comprises a non-elastic polymer with embedded reinforcing fibers.

5. The drum of claim 4, wherein the shell and the at least one head plate of the drum are formed integrally with one another.

6. The drum of claim 4, wherein the at least one reinforcing component comprises a reinforcing plate embedded within the at least one head plate for use when mounting a portion of the excitation system to the drum.

7. The drum of claim 1, wherein the non-elastic polymer is selected from the group consisting of epoxy, vinyl ester, polyester thermosetting plastic, nylon, and phenol formaldehyde resins; and the embedded reinforcing fibers are selected from the group consisting of glass, carbon, aramid, and basalt.

8. The drum of claim 7, wherein the embedded reinforcing fibers comprise carbon.

9. A roller compactor, comprising:
at least one drum configured to compact construction materials, the drum comprising:
an outer shell providing an exterior peripheral compacting surface,
wherein the outer shell comprises a polymer with reinforcing fibers; and
an excitation system at least partially within the outer shell for vibrating the drum,
the excitation system comprising an eccentric mass whose moment is selected based upon a mass of the drum.

10. The roller compactor of claim 9, wherein at least a portion of a wear ring is embedded within the shell, an edge of the wear ring is exposed at a distal end of the shell, wherein the edge of the wear ring provides a wear surface for the distal end of the drum.

11. The roller compactor of claim 9, wherein the shell further comprises an oleophobic component.

12. The roller compactor of claim 9, wherein the polymer is selected from the group consisting of epoxy, vinyl ester, polyester thermosetting plastic, nylon, and phenol formaldehyde resins; and the reinforcing fibers are selected from the group consisting of glass, carbon, aramid, and basalt.

13. The roller compactor of claim 9, wherein the drum further comprises at least one head plate extending from an interior surface of the outer shell, wherein the at least one head plate comprises a polymer with reinforcing fibers.

14. The roller compactor of claim 13, wherein the shell and the at least one head plate of the drum are formed integrally with one another.

15. The roller compactor of claim 13, wherein a reinforcing plate is embedded within the at least one head plate for use when mounting a portion of the excitation system to the drum.

16. A method of making a drum for a roller compactor, comprising:
performing an additive manufacturing process to build an integral, one-piece drum body from a fiber reinforced polymer, the drum body comprising an outer, substantially cylindrical shell with at least one head plate extending from an interior surface of the shell;

pausing the additive manufacturing process prior to completion of the drum body;
adding one or more reinforcing components to the partially completed drum body;
completing the additive manufacturing of the drum body, wherein the one or more reinforcing components is at least partially embedded within the drum body.

17. The method of claim 16, further comprising melting the fiber reinforced polymer, wherein the fiber reinforced polymer comprises a filament that has a polymer binder, micro filament reinforcing fibers and an oleophobic component.

18. The method of claim 16, wherein adding one or more reinforcing components comprises adding at least one reinforcing plate to the partially completed head plate.

19. The method of claim 16, wherein adding one or more reinforcing components comprises placing at least a portion of a wear ring at a distal end of the shell.

* * * * *